United States Patent [19]
Ootsu

[11] 4,060,344
[45] Nov. 29, 1977

[54] TRANSDUCER FOR CONVERSION OF SEA WATER-ENERGY

[76] Inventor: Fumio Ootsu, 6-4, Shirahae-cho, Saseho, Nagasaki, Japan

[21] Appl. No.: 735,409

[22] Filed: Oct. 26, 1976

[51] Int. Cl.² .......................... F04B 17/02; F03B 13/10
[52] U.S. Cl. ........................................ 417/330; 290/42; 415/8
[58] Field of Search .............. 417/330, 334, 335, 336; 415/2, 3, 4, 8; 60/398; 290/43, 42

[56] References Cited
U.S. PATENT DOCUMENTS

| | | | |
|---|---|---|---|
| 530,118 | 12/1894 | Nichols | 417/334 |
| 3,746,875 | 7/1973 | Donafelli | 417/330 X |
| 3,961,479 | 6/1976 | Anderson | 60/496 |
| 3,991,563 | 11/1976 | Pelin | 60/398 X |
| 4,023,915 | 5/1977 | Kerby | 415/1 |

*Primary Examiner*—Carlton R. Croyle
*Assistant Examiner*—Richard E. Gluck
*Attorney, Agent, or Firm*—Wenderoth, Lind & Ponack

[57] ABSTRACT

Several impeller chambers are disposed in spaced relationship within a rectangular casing whose interior communicates with the air. The casing and a U-shaped bank having two legs bridged by the casing are partly submerged in the sea to define a sea-water pool between them communicating with the outer sea water only through sea-water channels located on the lower portions of the impeller chambers. Sea waves overflowing the projecting bank portion flow into the pool and then through the sea-water channels to rotate impellers disposed in the chambers to operate air cylinders disposed outside each chamber. The air cylinders compress air to produce a high pressure air that is, in turn, transported through a common pipe to an adjacent shore to be converted to an electrical energy.

3 Claims, 7 Drawing Figures

TRANSDUCER FOR CONVERSION OF SEA WATER-ENERGY

BACKGROUND OF THE INVENTION

This invention relates to an apparatus for utilizing the energy of sea waves, and more particularly to a transducer apparatus for converting the energy of sea waves into a high pressure fluid energy.

There have been previously proposed various attempts to convert the energy of sea-waves into a mechanical energy but they have not be satisfactorily operated. It is an object of the present invention to provide a new and improved transducer apparatus for effectively converting the energy of sea waves into high pressure fluid on a large scale.

SUMMARY OF THE INVENTION

The present invention provides a transducer apparatus for converting the energy of sea waves into high pressure fluid energy. The apparatus is a combination of a rectangular casing having an interior in communication with the atmosphere, a plurality of impeller chambers in a spaced relationship within the casing, each of the impeller chambers including a plenum space on the upper portion thereof, a sea-water channel on the lower portion thereof communicating with the plenum space, (the sea-water channel having both ends opened into the exterior of the casing,) an impeller therein such that the upper portion thereof is located in the plenum space and a substantial portion of its lower half is located in the sea-water channel, and a rotary shaft for the impeller running slightly above and parallel to an interface between the plenum space and the sea-water channel, the rotary shaft having both end portions extending externally of the impeller chamber. The apparatus further has a fluid compression means on either side of the impeller chamber externally thereof which is operatively coupled to each end of the rotary shaft, and a U-shaped bank means with the legs of the U bridged by the casing. The arrangement is such that, with the casing and the U-shaped bank means submerged in the sea and the upper portions thereof projecting above the surface of the sea, a sea-water pool is formed between the casing and the U-shaped bank means which communicates with the outer sea water only through the sea-water channels and such that the sea waves overflowing the upper projecting portion of the bank means flow into the sea-water pool and then flow through the sea water channels to drive the associated impellers and thus cause the fluid compressor means to produce a high pressure fluid from the air.

BRIEF DESCRIPTION OF THE DRAWINGS

The present invention will become more readily apparent from the following detailed description taken in conjunction with accompanying drawings in which.

DESCRIPTION OF THE PREFERRED EMBODIMENT

Figure 1:
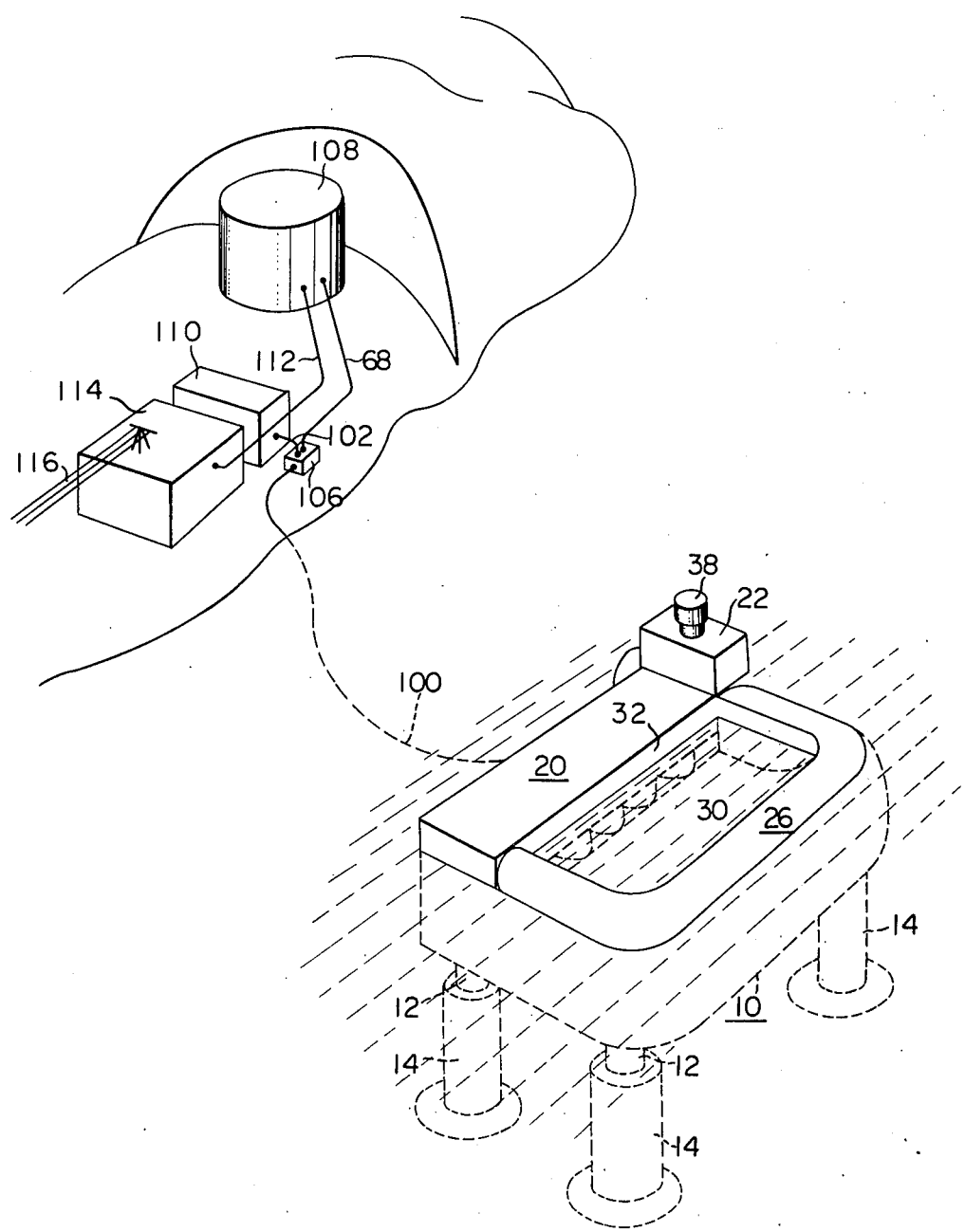
FIG. 1 is a schematic perspective view of a transducer apparatus for converting the energy of sea waves to an energy of a high pressure fluid constructed in accordance with the principles of the present invention and illustrated at its operating position.

Referring now to FIG. 1 of the drawings, a transducer apparatus for converting the energy of sea waves into high pressure fluid energy is shown in accordance with the principles of the present invention. The arrangement illustrated comprises a floating vessel in the form of a generally rectangular box designated by the reference numeral 10 and a plurality of, in this case, four, supporting legs 12 in the form of cylinders attached to the bottom of the vessel 10 on the corners and telescopically fitted into respective hollow cylinders 14 vertically planted on the bottom of the sea 16. The supporting legs 12 are formed of any suitable anticorrosive material and are responsive to any change in the surface of the sea as a result of tidal fluctuations. The legs 12 are slidably movable within the associated cylinders 14 for the purpose of maintaining a predetermined draft of the vessel 10. In order to facilitate the movement of each supporting leg 12 in its mating cylinder 14, a cross hole 18 in each cylinder 14 adjacent to the bottom of the sea 16 to permit the sea water to freely enter and leave that portion of the interior of the cylinder 14 located under the bottom of the associated leg 12.

In this way the vessel 10 is floating in the sea water and is vertically movable, but is protected against rocking movement.

Figure 2:
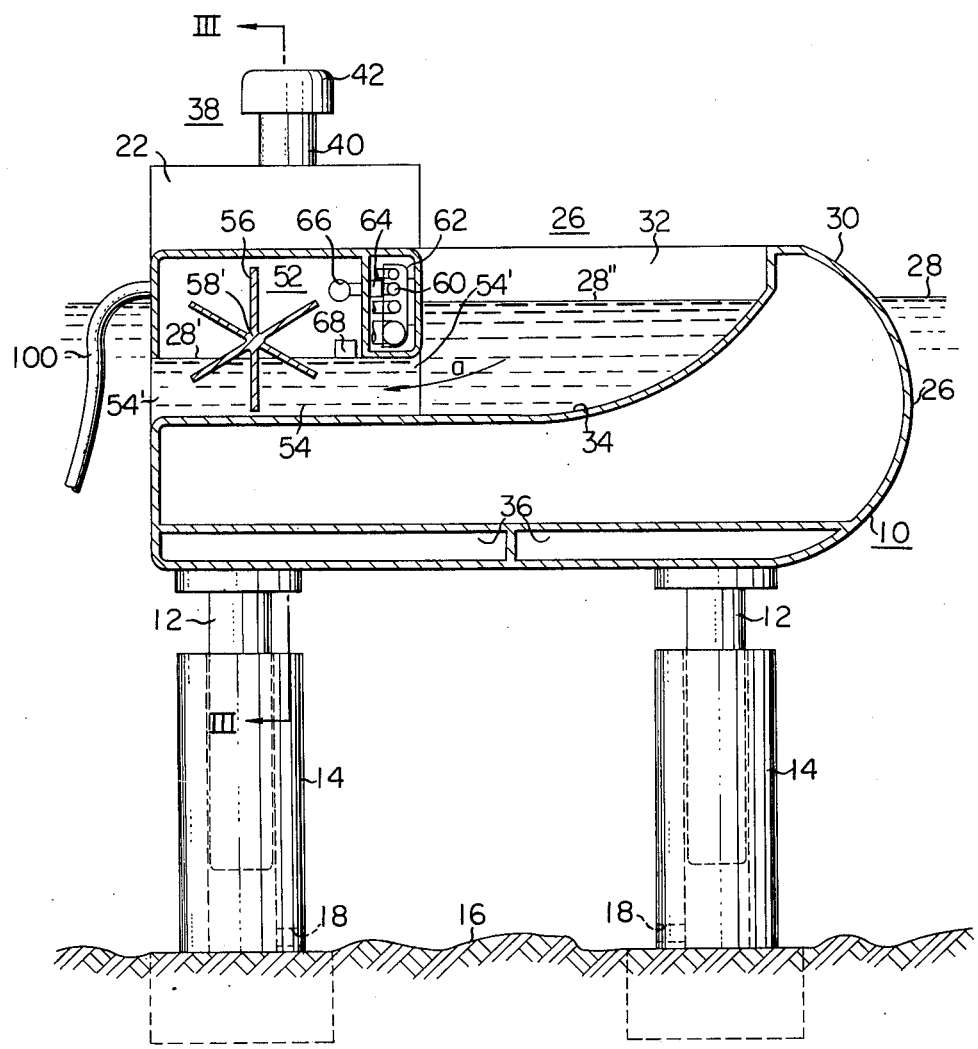
FIG. 2 is a schematic front elevational view, partly in longitudinal section of the vessel shown in FIG. 1.

The vessel 10 includes an upper portion having a longer side formed of a rectangular casing 20. One end portion of the rectangular casing 10 forms a machine room 22 and the remaining portion forms an atmosphere room 24. The remaining sides are in the form of a U-shaped hollow bank section 26 having both legs of the "U" bridged by the casing 20. As best shown in FIG. 2, the U-shaped bank section 26 has a top portion projecting above the surface of the sea 28 which forms an overflow portion 30 to permit sea waves from the outside thereof to flow into the interior of the U-shaped section 26 over the overflow portion 30. Thus the overflow portion 30 has such a cross sectional profile that it presents a low resistance to those sea waves flowing thereover so as to permit a sufficient amount of the sea water to flow into the interior of the bank section 26. The portion of the bank section 26 facing the casing 20 has an external surface shown in FIG. 2 as being outwardly convex and merged into the bottom wall of the vessel 10 and an internal surface tilted following a gently curved surface merged into the bottom wall of the casing 20 for the purpose as will be apparent later. As also shown in FIG. 2, the bank section 26 has a top surface flush with the top wall surface of the atmosphere room 24.

From the foregoing it will be appreciated that the casing 20 and the U-shaped bank section 26 define therebetween a space of rectangular horizontal section having three vertical side walls 32 formed of that side wall of the casing 20 near to the bank section 26 and the interior wall surfaces of both legs of the "U". The remaining side wall and the bottom wall 34 forming the upper or interior wall surface of the bank section 26 is curved as above described. The three side walls 32 project into a U-shape above the surface of the sea 28 as seen in FIG. 1 for the purpose as will be apparent hereinafter.

The vessel 10 includes a lower portion formed by the lower portion of the hollow bank section 26 and plurality of, in this case four, weighting or ballast chambers 36 disposed on the bottom thereof, although only two of the weighting chambers 36 are illustrated in FIG. 2. The weighting chambers 36 serve to sink the vessel 10 to a predetermined draft and maintain it in equilibrium.

The machine room 22 has a top wall somewhat higher than the top wall of the atmosphere room 24 and has an air introduction unit 38 upwardly extending therefrom. As best shown in FIG. 2, the air introduction unit 38 includes an air inlet pipe 40 having one end opened into the atmosphere and the other end opened into the interior of the machine room 22 and a protective cover 42 in the form of an inverted cup disposed above one end of the pipe 40 forming an annular gap through which the air is introduced into the inlet pipe 40 and, therefore the machine room 22. The protective cover 42 serves to prevent the sea water from entering the inlet pipe 40.

Within the machine room 22 are a switchboard 44 to which electric leads to all of the electric equipment installed in the vessel 10 are connected, and an electric motor operated air compressor 46, the purpose of which will be described hereinafter.

The atmosphere room 24 includes a plurality of, in this case, five impeller chambers 48 disposed in a spaced, aligned relationship therein. The impeller chambers 48 are of the same construction, and one of them will now be described in detail. Between the top and bottom walls of the atmosphere room 24 each impeller chamber 48 is defined by a pair of lateral partition walls 50 and a U-shaped wall interconnecting the upper portions of partition walls 50. The impeller chamber 48 includes a plenum space 52 located on the upper portion thereof and a sea water channel 54 located on the lower portion thereof and in fluid communication with the plenum space 52. An interface between the plenum space 52 and the sea water channel 54 is positioned slightly below the central horizontal plane of the chamber 48 and flush with the outer surfce of the horizontal wall portion of the U-shaped wall. The sea wall channel 54 extends through the impeller chamber 48 in a direction perpendicular to the longitudinal axis of the casing 20 and terminates at openings 54′ disposed on the adjacent portions of a pair of opposite longer side walls of the casing 20 to be coextensive with the cross section of the channel 54. Thus the channel 54 is put in fluid communication with the sea through that opening 54′ facing the sea water. Accordingly the sea water is permitted to enter the sea-water channel 54 and therefore enter the space formed between the casing 20 and the U-shaped bank section 26 to form a sea-water pool having a lever 28′ equal to that of the surface of the sea 28.

An impeller 56 is disposed within each of the impeller chambers 48 so that the upper half thereof is located in the plenum space 52 while a substantial portion of the lower half thereof is located in the sea-water channel 54. That is to say, the impeller 56 immersed into the sea water flowing through the channel 54 in operation as best shown in FIG. 2. To end, the impeller 56 includes a rotary shaft 58 hermetically and rotatably supported at both end portions by a pair of opposite partition walls 50 through respective bearings so as to be substantially parallel to and slightly above the interface between the plenum and sea-water channel 52 and 54 respectively, that is, the level of the sea water flowing through the channel 54.

Figure 3:
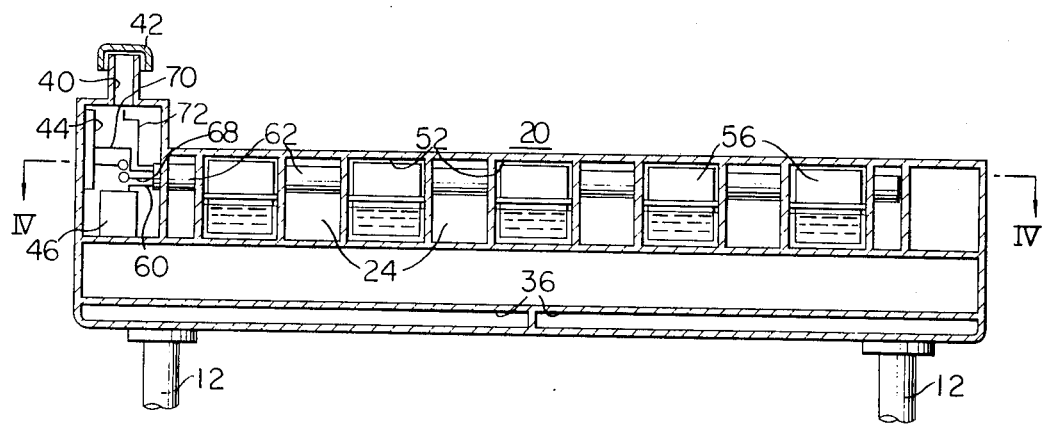
FIG. 3 is a fragmental, longitudinal sectional view of the vessel taken along the line III—III of FIG. 2.
Figure 4:
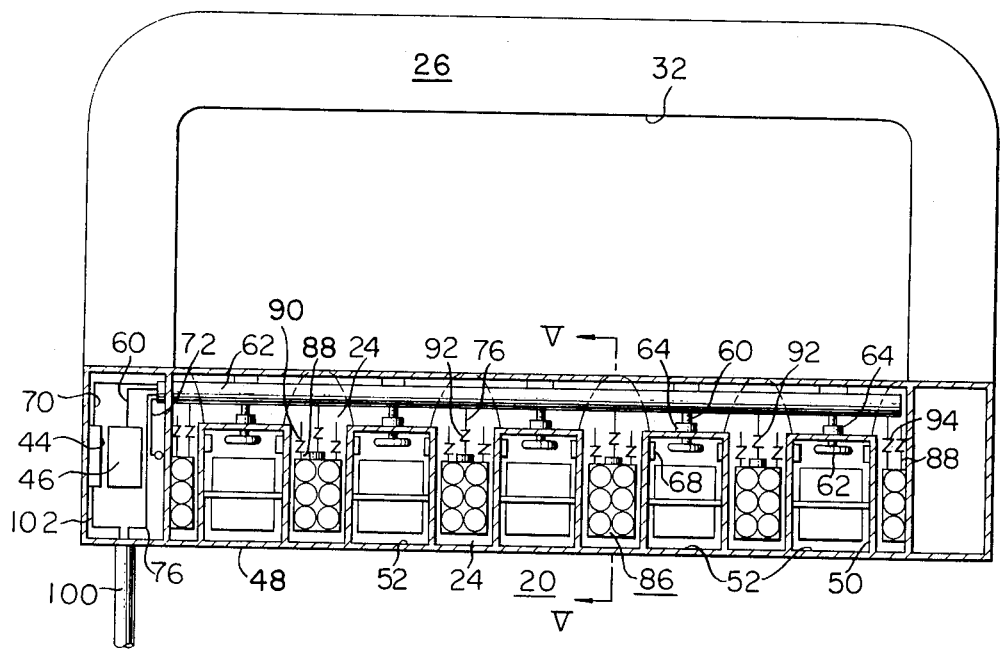
FIG. 4 is a cross sectional view of the vessel taken along the line IV—IV of FIG. 3.

As shown in FIGS. 3 and 4, a high pressure feed pipe 60 from the compressor 46 in the machine room 22 extends through a piping duct 62 running along that inner wall surface of the casing 20 near the bank section 26 along with other pipes and conduits as will be described later. The piping duct 62 has a plurality of branches, one for each impeller chamber 48. Each branch of the feed pipe 60 is provided with an electromagnetic valve 64 and is opened into a spout port 66 suitably disposed in the associated plenum space 52. Further, a pair of lever sensors 68 are disposed within the plenum space 52 at its position where its operating element is located on the interface between the plenum space 52 and the sea-water channel 54. A wiring conduit 70 connected to the switchboard 44 in the machine room 22 extends through the piping duct 62 and has passed therethrough electric leads connected to the electromagnetic valve 64 and the level sensors 68 for each impeller chamber 48.

The lever sensors 68 cooperate with the associated electromagnetic valve 64 to supply a high pressure fluid from the compressor 46 to plenum space 52 and maintain a fluid pressure within therein enough to keep the surface of the sea water in the sea-water channel 54 at a predetermined level as determined by the level sensors 68.

In addition, the piping duct 62 has therethrough an atmosphere pipe 72 having one end opened into the machine room 22 and includes a plurality of branches opened into the atmosphere room 24 on both sides of each impeller chamber 48 and a high pressure delivery pipe 76 as will be described hereinafter.

Figure 5:
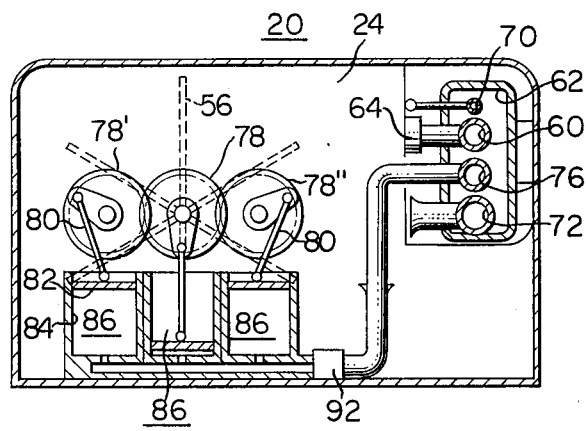
FIG. 5 is a longitudinal section view of the transducer unit shown in FIGS. 3 and 4 with the section taken along the line V—V of FIG. 4.
Figure 6:
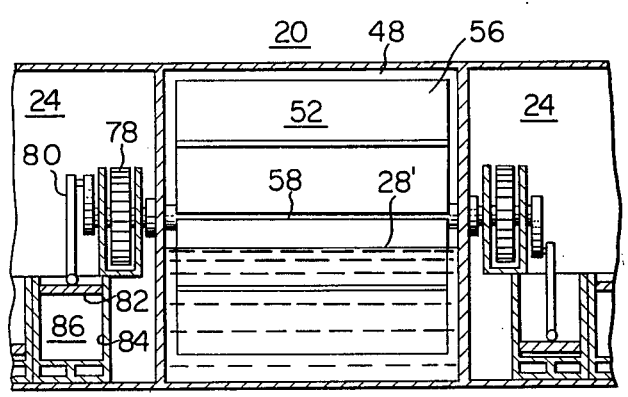
FIG. 6 is a fragmented longitudinal sectional view in an enlarged scale of the transducer unit shown in FIGS. 3 and 4.

As shown in FIG. 6, a pair of similar spur gears 78 are mounted on the free end portions of the rotary shaft 58 projecting into the atmosphere room 24. As shown in FIG. 5, each of the spur gears 78 meshes with a pair of spur gears 78′ and 78″ disposed on both sides thereof in horizontal alignment with each other and with the gear 78. The three meshing gears 78, 78′ and 78″ are of the same construction and are operatively coupled by individual cranks 80 to respective pistons 82. The pistons 82 are slidably disposed in a plurality of fluid cylinders 84 on either side of the associated impeller chamber 48 respectively and are aligned with one another. Each piston 82 and its mating cylinder 84 form a mechanism for producing a compressed fluid, in this case air, generally designated by the reference numeral 86.

In the example illustrated, the three cylinders 84 are juxtaposed with one another on either side of the associated impeller chamber 48 and the mating cranks 80 have their instantaneous angular positions different from one another by angles of 120°. As shown in FIG. 4, the three cylinders 84 juxtaposed on either side of the mating impeller chamber 48 include a common air inflow pipe 88 with a check valve 90 connected in fluid communication with the bottom portions thereof and opened into the atmosphere room 24 toward the piping duct 62. Also each branch of the high pressure delivery pipe 76 includes a check valve 92 and is connected in fluid communication with the bottom portions of either a different group of the six cylinders 84 disposed side by side between each pair of adjacent chambers 48 or a group of the three outermost cylinders 84 with a check valve 94 (see FIGS. 4 and 5).

Figure 7:
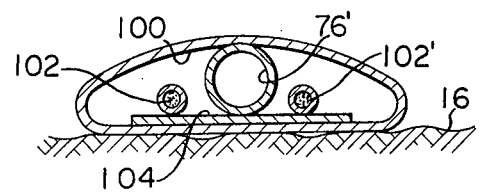
FIG. 7 is a cross sectional view of that portion of the connection cable shown at dotted line in FIG. 1 and disposed on the bottom of the sea.

As best shown in FIG. 2, the machine room 22 has aflexible water-proof cable sheath 100 extending therefrom. The cable sheath 100 is trained over the bottom of the sea 16 until it reaches at a shore adjacent to the vessel 10 as shown in FIG. 1. As shown in FIG. 7, the cable sheath 100 is relatively flat so as to present a low resistance to tidal currents and includes a flexible extension 76' of the high pressure delivery pipe 76 and, a pair of electric cables 102 and 102' extending therethrough. Each of the electric cables includes electric conductors connected to the switchboard 44 in the machine room 22. One of the electric cables, for example the cables 102' functions as a spare. Further a number of small flat pieces are consecutively disposed on the bottom of the cable sheath 100 to form a weight 104 serving to stably lay the sheath 100 on the bottom of the sea 16.

Referring back to FIG. 1, the cable sheath 100 after having landed at the shore enters a cable house 106 located in the proximity of the shore. In the house 106 the pipe extension 76' is provided with a check valve (not shown) and then leaves the house 106 until it is connected to a high pressure tank 108 disposed adjacent to the cable house 106. On the other hand, the pair of electric cables 102 and 102' (which are shown at a single line) enter a remote control cottage 110. A high pressure feed pipe 112 from the tank 108 is connected to a high pressure fluid operated motor (not shown) disposed in an electric power generation plant 114 adjacent to the remote control cottage 110. The motor is operatively coupled to an electric generator (not shown) disposed in the plant 114 and connected at the output to a transmission system 116. The generator is also adapted to supply electric power to the vessel 10 through either one of the electric cable 102 or 102'.

The arrangement thus far described is operated as follows: It is assumed that the vessel 10 has been maintained at a predetermined draft in the sea to permit the sea water to charge each impeller chamber 48 up to a part of the associated plenum space 52 and also the space between the casing 20 and the U-shaped bank section 26 to form a sea-water pool therein. Then an actuation signal from the remote control cottage 110 is delivered, for example, by the electric cable 102 to the compressor 46 in the machine room 22 to drive it from a source of electric power disposed therefor in the room 22 to supply a high pressure air to each of the plenum spaces 52 through the high pressure pipe 60 to increase a fluid pressure within that plenum space 52 and depress the level of the sea water in the associated water channels 54. Upon the sea water in each channel 54 reaching a predetermined level as determined by the associated level sensors 68, the electromagnetic valves 64 in each pipe 60 responds to a control signal from the remote control cottage 110 fed thereto through the cable 102 to close to stop the supply of the high pressure air to the associated plenum space 52 to maintain the predetermined sea level in the mating sea-water channel 54. If the sea level in a particular channel 54 exceeds the predetermined level, the associated sensors 68 are operated to open the corresponding electromagnetic valves 64 in response to a control signal from the control cottage 110. In this way, the level sensors 68 cooperate with the associated electromagnetic valves 64 to maintain the predetermined sea level in each of the sea-water channels 54. Under these circumstances the sea-water pool confined by the casing 20 and U-shaped bank section 26 has its sea level 28" maintained quiet. When sea waves enter the pool over the overflow portion 30, to increase the sea lever 28", a rush of sea-water is caused in each sea-water channel 54 in the direction of the arrow a shown in FIG. 2.

Within each impeller chamber 48 the stream of sea water flowing through the associated sea-water channel 52 causes the rotation of the impeller 56 in the clockwise direction as viewed in FIG. 2. The rotation of each impeller 56 causes the actuation of the associated air compression mechanisms 86 through the mating spur gears 78, 78' and 78" and the cranks 80. The air spouted into the atmosphere room 24 from the associated atmosphere pipe 72 and sucked into the cylinders 82 through the corresponding pipe 88 is compressed and the high pressure air is delivered through the adjacent high pressure pipes to the high pressure delivery pipe 76. Then, the compressed air flowing through the pipe 76' within the cable sheath 100 enters the high pressure tank 108. The high pressure air accumulated in the tank 108 is fed to the fluid operated motor (not shown) disposed in the power generation plant 114 to rotate the electric generator (not shown) connected to the motor to produce an electric power. The electric power is adapted to be transmitted through the transmission system 116.

It is noted that once the electric power has be produced in the power generation plant 114, the compressor 44 is switched to be energized with a part of that electric power supplied thereto through the cable 102.

In operation, the vessel 10 is preferably oriented so that the sea-water channels 54 are directed in a direction substantially perpendicular to the direction of propagation of sea waves. Also even with the direction of propagation of the waves more or less changed, it is ensured that a sufficiently large amount of the sea water can enter the sea-water pool because the overflow portion 28 protrudes into a U-shape above the sea level 28 as shown in FIG. 1.

Also each of the supporting legs 12 telescopically fitted into the mating cylinder 14 cooperates with the cross hole 18 disposed on that cylinder to permit the floating vessel 10 to ascend and descend in response to a variation in the surface of the sea 28 due to the flux and reflux to maintain a substantially constant quantity of sea water in the space between the casing and U-shaped bank sections 20 and 26 respectively. However it is to be noted that the cross holes 14 have dimensions small enough to substantially prevent the draft of the floating vessel 10 from changing due to the overflow of the sea water into the abovementioned space though its quantity would be large.

While the present invention has been illustrated and described in conjunction with a single preferred embodiment thereof it is to be understood that numerous changes and modifications may be resorted to without departing from the spirit and scope of the present invention. For example, the present invention is equally applicable to apparatus requiring high pressure fluid other than an electric power generation plant as above described.

What is claimed is:

1. A transducer apparatus for converting the energy of sea waves to an energy of a high pressure fluid, comprising, in combination, a rectangular casing having an interior communicating with the air, a plurality of impeller chambers disposed in spaced relationship within said casing, each of said impeller chambers including a plenum space located on the upper portion thereof, a sea-water channel located in the lower portion thereof to communicate with said plenum space, said sea-water channel having both ends opened into the exterior of said casing, an impeller disposed therein such that an upper portion thereof is located in said plenum space and the substantial portion of its lower half is located in said sea-water channel, and a rotary shaft for said impeller running slightly above and in parallel to an interface between the plenum space and the sea-water channel, said rotary shaft having both end portions extending externally of said impeller chamber, fluid compression means disposed on either side of said impeller chamber externally thereof to be operatively coupled to each end of said rotary shaft, and a U-shaped bank means having a pair of legs of the U bridged by said casing, the arrangement being such that, with said casing and said U-shaped bank means partly submerged in the sea to project the upper portions thereof above the surface of the sea, a sea water pool is formed between said casing and said U-shaped bank means to communicate with the outer sea water only through said sea-water channels and that sea waves overflowing said upper projecting portion of said bank means flow through said sea water channels to drive the associated impellers to cause said fluid compressor means to produce a high pressure fluid from the air.

2. A transducer apparatus as claimed in claim 1 wherein said U-shaped bank means is of a hollow type and includes a plurality of supporting legs operatively coupled to the bottom of said bank means and telescopically fitted into hollow cylindrical members planted on the bottom of the sea and including cross holes located adjacent the bottoms thereof to part the interior of the associated hollow cylinders in fluid communication with the sea water.

3. A transducer apparatus as claimed in claim 1 wherein said fluid compression means includes at least one fluid cylinder means connected to either end of said rotary shaft through a crank.

* * * * *